United States Patent
Tao et al.

(10) Patent No.: US 11,936,578 B2
(45) Date of Patent: Mar. 19, 2024

(54) METHOD AND APPARATUS FOR RESOURCE CONFIGURATION FOR POSITIONING REFERENCE SIGNALS

(71) Applicant: Nokia Technologies Oy, Espoo (FI)

(72) Inventors: Tao Tao, Shanghai (CN); Jianguo Liu, Shanghai (CN); Zhe Luo, Shanghai (CN); Yan Meng, Shanghai (CN); Gang Shen, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 517 days.

(21) Appl. No.: 17/276,380

(22) PCT Filed: Sep. 27, 2018

(86) PCT No.: PCT/CN2018/108077
§ 371 (c)(1),
(2) Date: Mar. 15, 2021

(87) PCT Pub. No.: WO2020/061944
PCT Pub. Date: Apr. 2, 2020

(65) Prior Publication Data
US 2022/0038231 A1    Feb. 3, 2022

(51) Int. Cl.
*H04L 5/00*    (2006.01)

(52) U.S. Cl.
CPC .................... *H04L 5/0048* (2013.01)

(58) Field of Classification Search
CPC ..... H04L 5/0048; G01S 5/0236; G01S 19/05; H04W 64/00; H04W 12/037; H04W 12/0431; H04W 4/025; H04W 8/02; H04W 12/63; H04W 84/042; H04W 92/045

See application file for complete search history.

(56) References Cited

U.S. PATENT DOCUMENTS

| | | | |
|---|---|---|---|
| 2011/0158200 A1 | 6/2011 | Bachu et al. | |
| 2012/0051445 A1 | 3/2012 | Frank et al. | |
| 2018/0324740 A1* | 11/2018 | Edge | G01S 5/0236 |
| 2019/0158243 A1* | 5/2019 | Björkegren | H04W 56/001 |

(Continued)

FOREIGN PATENT DOCUMENTS

| | | |
|---|---|---|
| CN | 104956743 A | 9/2015 |
| CN | 107465497 A | 12/2017 |

(Continued)

OTHER PUBLICATIONS

WO 2018/143870 A1 (Year: 2018).*

(Continued)

*Primary Examiner* — Rushil P. Sampat
(74) *Attorney, Agent, or Firm* — Barta Jones, PLLC

(57) ABSTRACT

Embodiments of the present disclosure provide apparatus, methods and computer readable storage mediums for configuring resources for positioning reference signals. In one aspect, the apparatus determines a second set of resource configuration for positioning reference signal (PRS) mapping to resource elements in the second set, which is an extension of the first set of resource configuration for PRS mapping with additional resource elements. In another aspect, another apparatus determines configurations of at least one of the first set and the second set, to configure PRS transmission according to the first set or the second set.

18 Claims, 8 Drawing Sheets

(56) References Cited

U.S. PATENT DOCUMENTS

2020/0236644 A1* 7/2020 Gunnarsson .......... H04W 64/00
2021/0320768 A1* 10/2021 Yuan .................... H04L 5/0073

FOREIGN PATENT DOCUMENTS

| CN | 107819559 A | 3/2018 |
|---|---|---|
| WO | 2017/206437 A1 | 12/2017 |
| WO | 2018/028788 A1 | 2/2018 |
| WO | 2018/143870 A1 | 8/2018 |

OTHER PUBLICATIONS

WO 2020/041951 A1 (Year: 2020).*

Office action received for corresponding Chinese Patent Application No. 201880098112.1, dated Jul. 28, 2022, 8 pages of office action and no page of translation available.

"Introduction of support for PRS configurations based on PRS ID and PRS-based TBS", 3GPP TSG-RAN WG2 Meeting #95bis, R2-166675, Ericsson, Oct. 10-14, 2016, 9 pages.

"New SID: Study on NR Positioning Support", 3GPP TSG RAN Meeting #80, RP-181399, Agenda : 9.1.6, Intel Corporation, Jun. 11-14, 2018, 6 pages.

"3rd Generation Partnership Project;Technical Specification Group Radio Access Network;Evolved Universal Terrestrial Radio Access (E-UTRA);Physical channels and modulation (Release 15)", 3GPP TS 36.211, V15.2.0, Jun. 2018, pp. 1-236.

International Search Report and Written Opinion received for corresponding Patent Cooperation Treaty Application No. PCT/CN2018/108077, dated Jun. 28, 2019, 10 pages.

Extended European Search Report received for corresponding European Patent Application No. 18935778.3, dated May 20, 2022, 8 pages.

"PRS configurations for FeMTC", 3GPP TSG-RAN1 Meeting #87, R1-1611103, Agenda : 6.2.8.3, Ericsson, Nov. 14-18, 2016, pp. 1-5.

* cited by examiner

200

240

Determining a common rule for PRS mapping, and based on the common rule, deriving a full-set of PRS resource configuration that comprises available resource elements for PRS mapping

210

Determining a set of basic resource configuration for PRS Mapping to resource elements

220

Determining a set of extended resource configuration for PRS mapping to resource elements, which is an extension of the set of basic resource configuration with additional resource elements

230

Transmitting configurations of at least one of the two sets, to configure PRS transmission according to the at least one of the two sets

FIG. 2

METHOD AND APPARATUS FOR RESOURCE CONFIGURATION FOR POSITIONING REFERENCE SIGNALS

RELATED APPLICATION

This application was originally filed as PCT Application No. PCT/CN2018/108077, filed on 27 Sep. 2018.

TECHNICAL FIELD

The non-limiting and exemplary embodiments of the present disclosure generally relate to a signal transmission in wireless communication system, and specifically to methods, apparatus and computer readable storage medium for resource configuration for positioning reference signals in a New Radio (NR) system.

BACKGROUND

Currently, positioning technologies is a hot point in researches in wireless communication. Solutions of positioning technologies in new radio (NR) system include at least NR-based RAT (Radio Access Technology) dependent positioning to operate in both FR1 (Frequency Range 1) and FR2 (Frequency Range 2).

Observed time difference of arrival (OTDOA) is a downlink positioning method in LTE (Long Term Evolution), starting from Rel-9 and further enhanced in Rel-11 and Rel-13. In LTE, positioning reference signals (PRS) have been introduced to allow proper timing measurements of a UE (User Equipment) from base station signals to improve OTDOA positioning performance.

OTDOA, as a mature positioning technology and successfully specified in LTE standardization, is also studied in positioning technologies in the NR system. Research of this technology focus on PRS design (especially resource configuration) in the NR system. A proper PRS design is required to achieve high positioning accuracy with less impact on normal traffic.

SUMMARY

The present disclosure is going to solve the aforementioned problems by proposing a scalable resource configuration mechanism for transmission of positioning reference signals, in order to balance the trade-off between the positioning accuracy and transmission performance of normal traffics. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is a method for configuring transmission resources for positioning reference signals (PRS) provided. The method comprises determining a second set of resource configuration for PRS mapping to resource elements, wherein the second set is an extension of the first set of resource configuration for PRS mapping with additional resource elements. The method further comprises transmitting configurations of at least one of the first set and the second set, to configure PRS transmission according to the first set or the second set.

In one embodiment, the method can further comprise determining the first set of resource configuration for PRS mapping. The first set can be determined based on at least one of a basic requirement of positioning accuracy and a greatest common slot format among various slot formats of the transmission resources.

In one embodiment, the method can further comprise deriving a full-set of PRS resource configuration that comprises available resource elements for PRS mapping based on the common rule. At least one of the first set and the second set can be determined from the full-set. The common rule can be a mapping rule with which multiplexing of the positioning reference signals transmitted from different transmission points is supported.

In one embodiment, the second set can be determined according to at least one of a common rule for PRS mapping; a group of factors comprising an interference situation; a short-term slot format and frame structure; a traffic situation in downlink and/or uplink; and additional requirement of positioning accuracy.

In one embodiment, a configuration of the first set can be transmitted to a location server, so as to be conveyed to at least one user equipment.

In one embodiment, a configuration of the second set can be transmitted from a base station to one or more user equipment, wherein the one or more user equipment is being served by the base station. In this case, the configuration of the second set can be transmitted via physical layer signaling or high layer signaling. In another embodiment, configurations of at least one of the first set and the second set can be transmitted from a base station to a location server or another base station, so as to be conveyed to at least one user equipment.

In one embodiment, the method can further comprise transmitting positioning reference signals according to one of the first set of resource configuration and the second set of resource configuration. The positioning reference signals are transmitted according to one of the first set of resource configuration and the second set of resource configuration in response to a request from a location server or based on a determination of a base station. Transmitting the positioning reference signals according to the second set of resource configuration can comprises transmitting an indication of a presence of the second set. The indication of the presence of the second set can be transmitted by transmitting predefined positioning reference signals in at least one resource elements according to the first set of resource configuration.

In one embodiment, the second set can be indicated by full information of the second set, or by information of the additional resource elements based on the first set.

In one embodiment, the first set and the second set can be determined by a base station. The positioning reference signals can be transmitted via a new radio system.

In a second aspect of the disclosure, there is provided method for receiving positioning reference signals at a user equipment. The method comprises receiving a configuration of a second set of resource configuration for PRS mapping to resource elements, which the second set is an extension of a first set of resource configuration for PRS mapping with additional resource elements. The method further comprises detecting positioning reference signals according to at least one of the first set and the second set.

In one embodiment, the method can further comprise receiving a configuration of the first set of resource configuration for PRS mapping. In an example, the method can comprise receiving configurations of at least one of the first set and the second set from a location server.

In another example, the method can comprise receiving a configuration of the second set from a base station. The base station can be a serving base station of the user equipment.

In one embodiment, the method can further comprise detecting an indication of a presence of the second set. The presence of the second set can be detected from predefined positioning reference signals in at least one resource elements according to the first set of resource configuration.

In a third aspect of the disclosure, there is provided an apparatus for configuring transmission resources for positioning reference signals (PRS). The apparatus may comprise a processor and a memory communicatively associated with the processor. The memory may have computer coded instructions stored therein, said instructions when executed by the processor causing the apparatus to perform the method according to the first aspect of the present disclosure.

In a fourth aspect of the disclosure, there is provided an apparatus for receiving positioning reference signals at a user equipment. The apparatus may comprise a processor and a memory communicatively associated with the processor. The memory may have computer coded instructions stored therein, said instructions when executed by the processor causing the apparatus to perform the method according to the second aspect of the present disclosure.

In a fifth aspect of the disclosure, there is provided an apparatus for configuring transmission resources for positioning reference signals (PRS). The apparatus may comprise process means adapted to perform any method in accordance with the first aspect of the disclosure.

In a sixth aspect of the disclosure, there is provided an apparatus for receiving positioning reference signals at a user equipment. The apparatus may comprise process means adapted to perform any method in accordance with the second aspect of the disclosure.

In a seventh aspect of the disclosure, there is provided a computer readable storage medium, on which stored computer code instructions. When the computer code instructions are executed on at least one processor, at least one processor is caused to carry out the method according to the first aspect of the disclosure.

In an eighth aspect of the disclosure, there is provided a computer readable storage medium, on which stored computer code instructions. When the computer code instructions are executed on at least one processor, at least one processor is caused to carry out the method according to the second aspect of the disclosure.

According to the various aspects and embodiments as mentioned above, an issue of resource configuration for positioning reference signals can be resolved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 illustrates a flowchart of a resource configuration mechanism for PRS transmission according to at least part of embodiments of the disclosure;

DETAILED DESCRIPTION

Figure 1B:
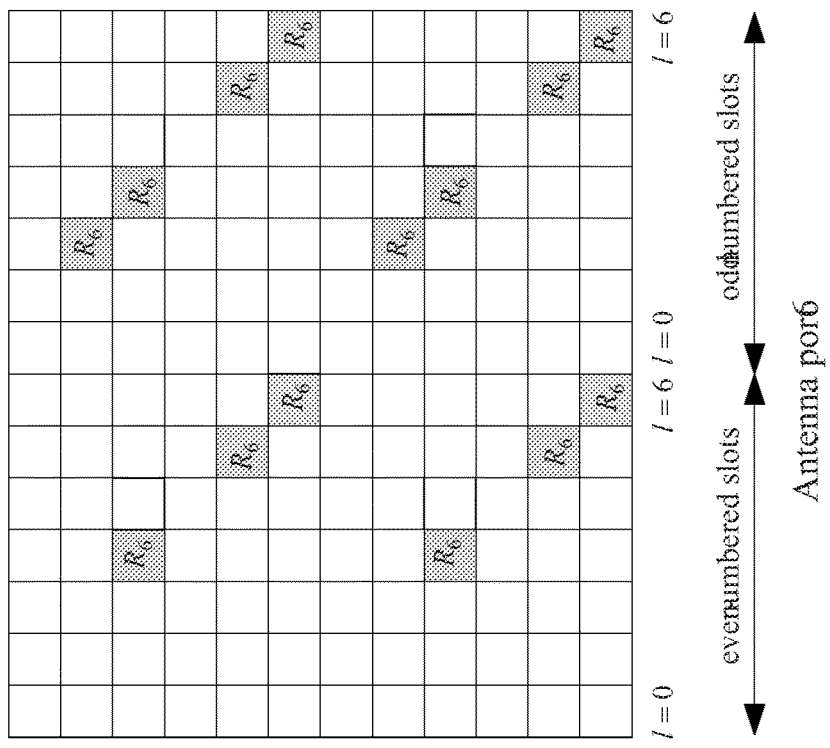
FIGS. 1A and 1B illustrate exemplary mappings for positioning reference signals.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, unless defined otherwise, all technical and scientific terms used herein have the same meaning as commonly understood by one of ordinary skills in the art to which this disclosure belongs. For example, the term "user equipment" used herein may refer to any terminal device or user equipment (UE) having wireless communication capabilities, including but not limited to, mobile phones, cellular phones, smart phones, or personal digital assistants (PDAs), portable computers, and the like. Furthermore, user equipment that is not mobile may also readily employ embodiments of the present invention. In the following description, the terms "user equipment", "UE" and "terminal device" may be used interchangeably. Similarly, the term "base station" may represent a base station (BS), a node B (NodeB or NB), an evolved NodeB (eNodeB or eNB), a gNodeB (gNB) and a relay node (RN), and so forth. The term "transmission point" may represent an apparatus for transmitting any information or data, including PRS signals.

For illustrative purposes, several embodiments of the present disclosure will be described in the context of a NR system. Those skilled in the art will appreciate, however, that the concept and principle of the several embodiments of the present disclosure may be more generally applicable to other wireless networks, for example a third generation Long Term Evolution (3G-LTE) network, a fifth generation (4G) network, 4.5G LTE, or a future network (e.g. 5G network).

As mentioned above, a proper PRS design is required to support OTDOA positioning algorithms to achieve high positioning accuracy. PRS design includes many aspects, such as PRS sequence generation; PRS resource configuration; PRS muting pattern etc. This disclosure mainly focuses on a design for PRS resource configuration in a NR system, especially how to map reference signal sequences to resource elements for positioning reference signal transmission.

Figure 1A:
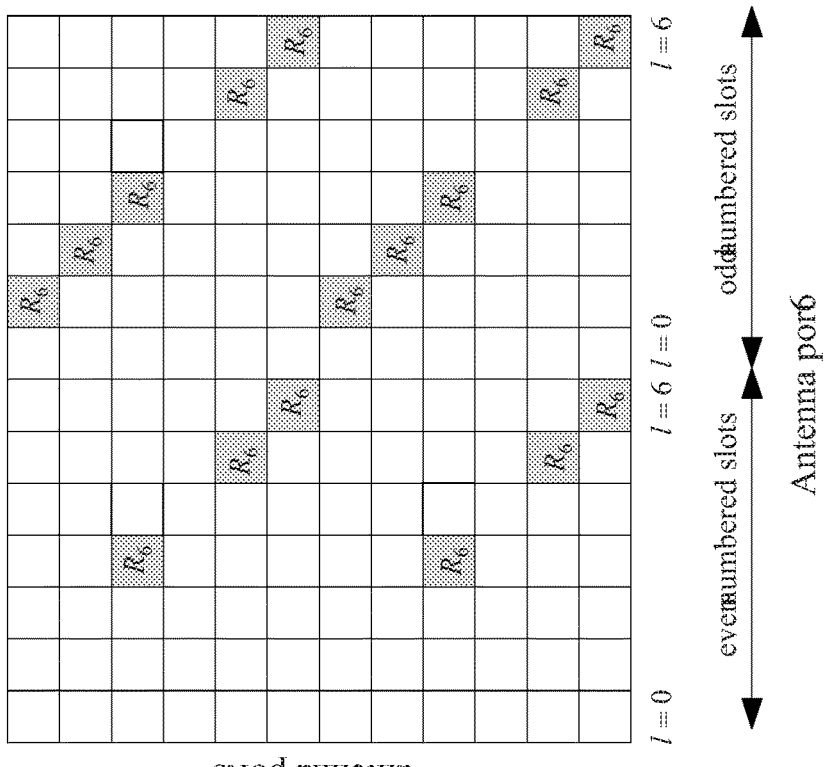

In LTE, PRS is mapped in diagonal patterns with shifts in frequency and time for multiplexing. For example, a cell-specific frequency shift is introduced in PRS mapping rules, i.e., $v_{shift}=N_{ID}^{PRS}$ mod6. Therefore, PRS has an effective reuse of six, i.e., six possible diagonal patterns. FIGS. 1A and 1B illustrate exemplary PRS mappings of normal cyclic prefix (CP) case according to a protocol 3GPP 36.211 v15.2.0 ("Physical channels and modulation"). For one certain kind of antenna port (e.g. one, two or four PBCH antenna ports), there is only one PRS mapping pattern for PRS with normal cyclic prefix. For PRS with extended cyclic prefix, there is also only one PRS mapping pattern for one certain kind of antenna port.

Furthermore, the PRS mapping to resource elements (RE) needs to avoid the symbols with cell-specific reference signals (CRS) and downlink control channels (PDCCH) transmission. So, a design principle of PRS resource configuration in LTE is to avoid collision with more important signaling, e.g., CRS, PDCCH, PBCH (physical broadcast channel), PSS (primary synchronization signal), and SSS (secondary synchronization signal).

However, using the same design principle for PRS resource configuration in a NR system will be not efficient, as an agiler physical layer with new features is supported in a NR system. For example, the control region is more flexible in the NR system, i.e., control resource set (CORESET) is UE-specific and configurable. In addition, there is no CRS in the NR system. Instead, configurable channel status information reference signal (CSI-RS) is introduced to replace the role of CRS in a LTE system.

Since CORESET and CSI-RS configuration is very flexible in the NR system, a base station in-principle can configure no control region and no CSI-RS in physical resource blocks (PRBs) with PRS transmission. Therefore, in a most radical case, the PRS can be mapped to all symbols within a slot. Allocating PRS in more symbols within a slot will clearly increase the positioning accuracy. However, the CORESET information is essential for scheduling the downlink or uplink data, and the CSI-RS is important for system maintenance, such as radio link monitoring (RLM), beam management, etc. Therefore, the PRS configuration's impact on CORESET and CSI-RS should be controllable at the base station, especially when the PRS bandwidth is relatively large.

How to balance the trade-off between link performance for normal traffic and the PRS resource density would be an issue for PRS design in a NR system. Embodiments of this disclosure provide a scalable mechanism of PRS resource configuration to solve this problem. In this disclosure, a scalable resource configuration mechanism is proposed for PRS transmission, in order to balance the trade-off between the position accuracy and normal traffic transmission performance. In this mechanism, two sets of resource configurations are configured for PRS mapping.

Figure 6:
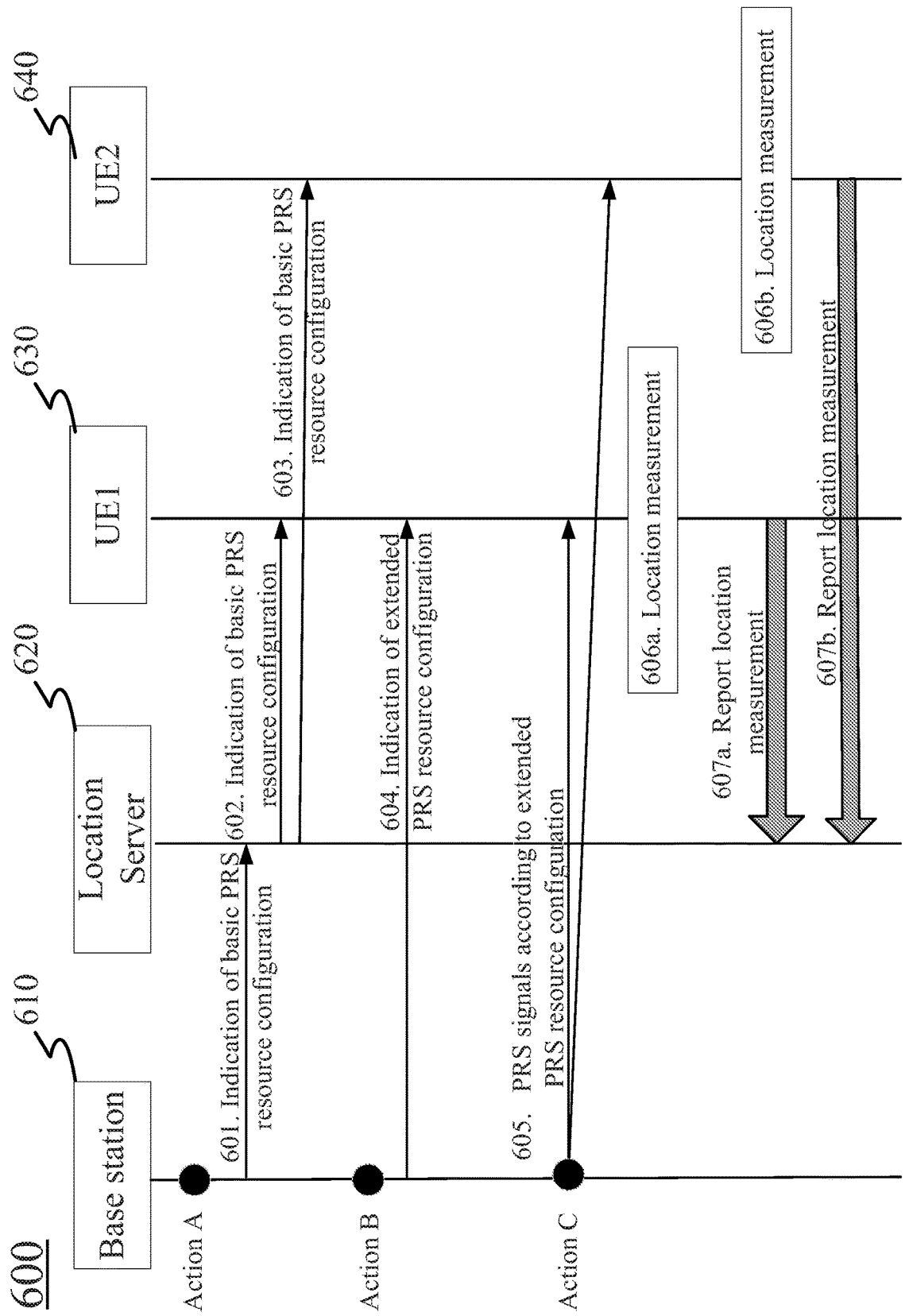
FIG. 6 illustrates a flowchart of a PRS transmission procedure according to an embodiment of the disclosure.
Figure 7:
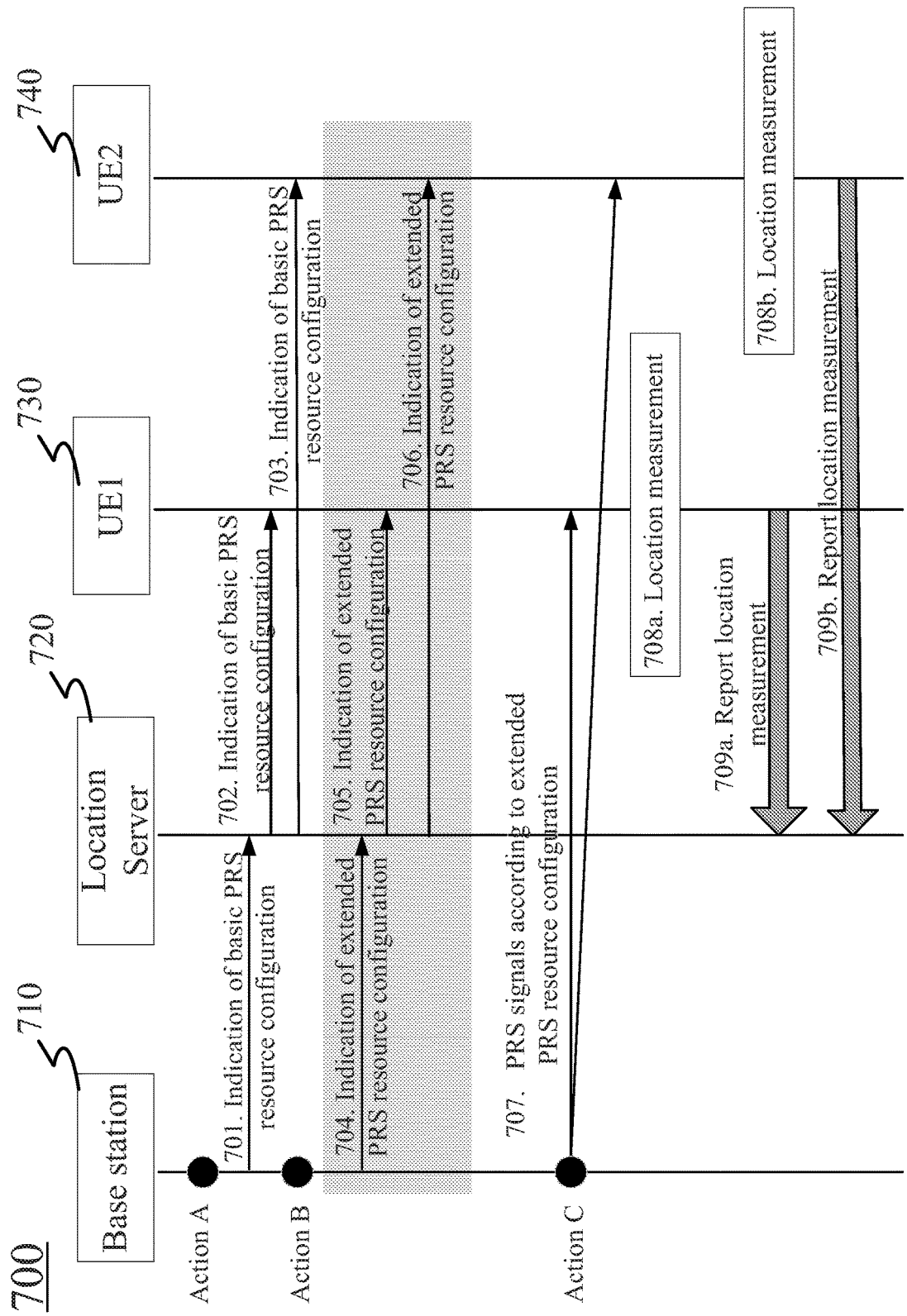
FIG. 7 illustrates a flowchart of a PRS transmission procedure according to another embodiment of the disclosure.

FIG. 2 illustrates a flowchart of the resource configuration mechanism for PRS transmission. The method 200 can be performed at a base station, such as the base station 610, 710 as shown in FIGS. 6 and 7. As shown at block 210, the method 200 comprises determining a set of basic resource configuration for PRS mapping to resource elements. The set of basic resource configuration can be determined based on a basic requirement of positioning accuracy. For example, the base station can determine the set of basic resource configuration based on the minimum requirement of positioning accuracy. Alternatively, or additionally, the set of basic resource configuration can be determined based on a greatest common slot format among various slot formats of transmission resources.

In some embodiments, the set of basic configuration can be predefined, for example in a specification obeyed by both the base station and user equipment. Then, the base station does not need to determine the set of basic PRS configuration.

As shown at block 220, the method 200 further comprises determining a set of extended resource configuration for PRS mapping to resource elements, which is an extension of the set of basic resource configuration with additional resource elements. The base station can determine the extended resource configuration based on additional criteria, e.g., the interference level from neighbor cells, the slot format and frame structure in short-term, load situation in downlinks and uplinks, and supplementary requirements of positioning accuracy, and so on.

As shown at block 230, the method 200 further comprises transmitting configurations of at least one of the set of basic resource configuration and the set of extended resource configuration, to configure PRS transmission according to the at least one of the set of basic resource configuration and the set of extended resource configuration. The base station could indicate the set of basic PRS resource configuration to a location server. The location server can hence convey this information as a part of PRS configuration (e.g., PRS Info), when it sends the corresponding message to UEs. The base station could indicate the extended PRS resource configuration to its own serving UEs, i.e. UEs in a serving cell provided by the base station. For example, indications of the extended PRS resource configuration can be delivered via a high layer signaling (e.g., radio resource control (RRC) layer) or a physical layer signaling. The base station could also indicate the extended PRS resource configuration to UEs, that are not in a serving cell of the base station and are called non-serving cell UEs. Methods of indicating the extended PRS resource configuration to non-serving cell UEs are not precluded. For example, the base station can indicate the extended PRS resource configuration to the non-serving cell UEs via a location server or other base stations.

In some embodiments, the base station can transmit PRS signals according to the set of basic resource configuration or the set of extended resource configuration. For example, the PRS signals can be transmitted according to one of the resource configurations in response to a request from a location server, or based on a determination of a base station.

In other embodiments, the PRS signals can be transmitted through entities separated from the base station, such as a remote radio unit. For example, the remote radio unit can transmit PRS signals according to the set of basic resource configuration or the set of extended resource configuration based on configurations from a base station.

In some embodiments, PRS resources in the set of basic resource configuration may be configured based on a common PRS mapping rule. The base station may determine a common rule for PRS mapping. The common PRS mapping rule defines how PRS maps to resources across all OFDM symbols within a slot. PRS multiplexing among multiple UEs is supported with such a common mapping rule. Based on the common mapping rule, the base station can derive a full-set of PRS resource configuration, which contains all potential PRS resources (e.g., within a slot). These potential PRS resources comprise all resource elements available for PRS mapping in principle.

The base station may determine PRS resource elements in the set of basic resource configuration from the full-set. In this regard, the basic resource configuration is a sub-set of the full-set of PRS resource configuration. Based on the full-set of PRS resource configuration, the base station can configure the set of extended PRS resource configuration. The additional PRS resource elements in the extended PRS resource configuration may be also determined from the full-set. In this regard, the extended resource configuration is also a sub-set of the full-set.

Herein, the resource elements mentioned above may include time resource (e.g., OFDM symbols), frequency resource (e.g., subcarriers), and space resource (e.g., antenna/beam resource). The PRS mentioned above may include any signals for positioning reference.

Although steps are shown in FIG. 2 in a particular order for purposes of illustration, in other embodiments one or more steps, or portions thereof are performed in a different order or overlapping in time, performed in series or parallel, or the process is changed in some combination of ways. For example, the transmission of the indication of the set of basic PRS resource configuration can be performed separately from the transmission of the indication of the set of the extended PRS resource configuration. The indication of the set of basic PRS resource configuration may be transmitted immediately after the determination of the set of basic PRS resource configuration. The indication of the set of the extended PRS resource configuration may be transmitted after the indication of the set of basic PRS resource configuration. Alternatively, transmissions of the indication of the set of the extended PRS resource configuration may be performed in parallel with transmissions of the indication of the set of basic PRS resource configuration.

Through the proposed solutions of this disclosure, a base station could transmit PRS signals according to the set of extended resource configuration.

Then, a UE can evaluate non-serving cell time of arrival (TOA) based on PRS transmission from non-serving cells according to a set of basic PRS resource configuration received from a location server. If the UE does not been informed with the set of extended resource configuration, the UE can only detect PRS sequences in resource elements configured according to the set of basic PRS resource configuration, and cannot detect PRS sequences in the additional resource elements extended by the set of extended PRB resource configuration. If the UE receives such set of extended PRB resource configuration somehow, the UE can also evaluate non-serving cell time of arrival (TOA) based on PRS transmission from non-serving cells according to the extended PRS resource configuration. Accordingly, besides the PRS sequences in resource elements configured according to the set of basic PRS resource configuration, the UE can further detect PRS sequences in the additional resource elements extended by the set of extended PRB resource configuration.

A UE can evaluate serving cell TOA based on RPS transmitted from serving cells, according to a set of basic PRS resource configuration received from a location server or a set of extended PRS resource configuration indicated via RRC signaling or PHY signaling. If the UE does not receive the set of extended resource configuration, the UE can only detect PRS sequences in resource elements configured according to the set of basic PRS resource configuration, and cannot detect PRS sequences in the additional resource elements extended by the set of extended PRB resource configuration. If the UE receives the set of extended PRB resource configuration, besides the PRS sequences in resource elements configured according to the set of basic PRS resource configuration, the UE can further detect PRS sequences in the additional resource elements extended by the set of extended PRB resource configuration. An embodiment of configuring common PRS mapping rule, the basic PRS resource configuration and the extended PRS resource configuration is described in the following.

Figure 3:
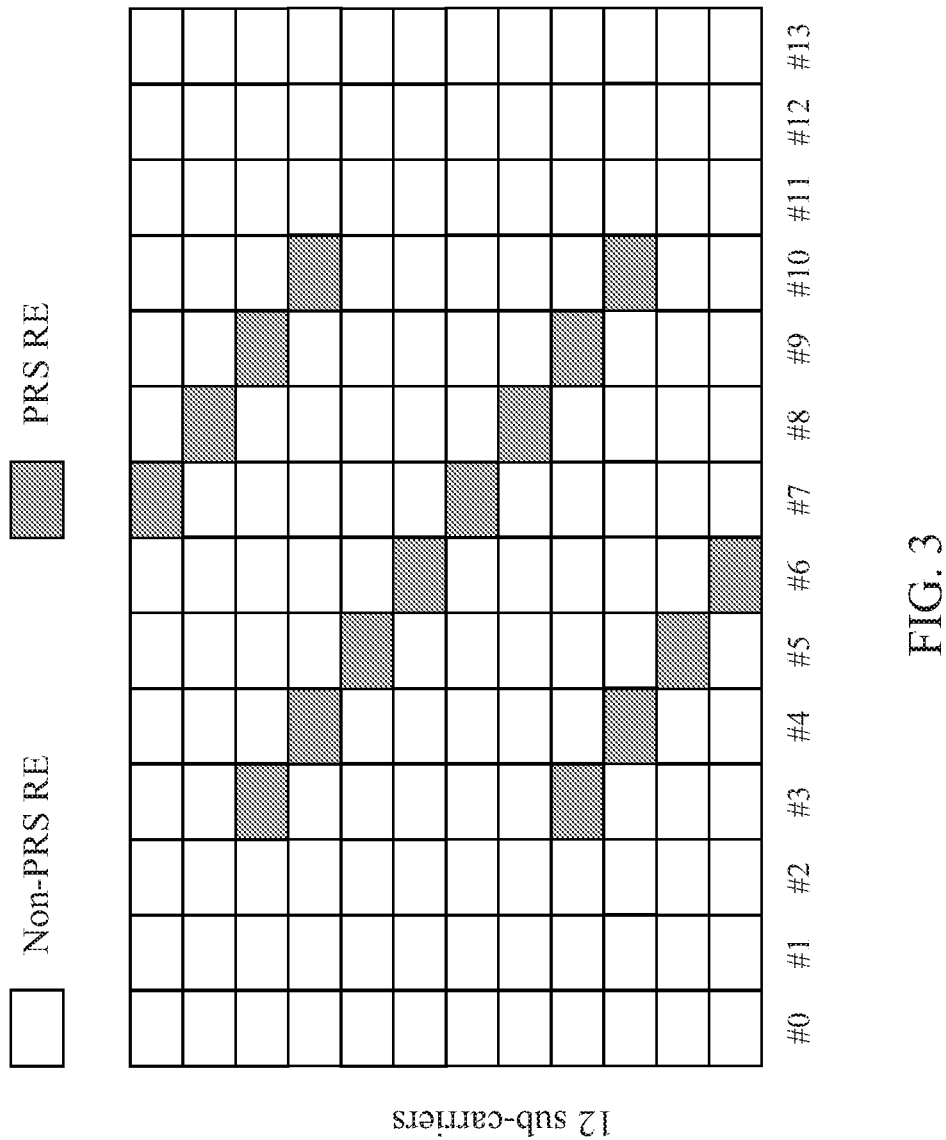
FIG. 3 illustrates an example available PRS resources within one physical resource block.

A common PRS mapping rule can allocate the PRS sequence to all symbols in a slot. For example, the PRS sequence can map to the resource element $r_{k,l}^{(p)}$ (in one PRB), where p is antenna port
$k=6m+(6-1+v_{shift}) \bmod 6$
$l=0, 1, \ldots, 13$
$m=0,1$
$v_{shift}=N_{ID}^{PRS} \bmod 6$, where $N_{ID}^{PRS}=N_{ID}^{cell}$ if no value for $N_{ID}^{PRS}$ is configured by higher layers An example of PRS resource derived from the mapping rule is shown in FIG. 3. A common mapping rule can be specified in a specification or exchanged among base stations and UEs (e.g., via a location server). With this full-set PRS resource configuration, the base station can further determine the basic and extended PRS resource configuration (i.e., which OFDM symbols are used for PRS transmission).

The basic PRS resource is guaranteed resources where the base station could transmit PRS by default. Thereby, the non-serving cell TOA estimation can be performed based on the PRS transmission in the basic resource.

The determination of basic configuration could be based on a minimum localization requirement. For example, if it requires 8-symbol PRS transmission to fulfill a certain positioning accuracy, the base station can firstly determine the number of PRS symbols within a slot to be 8.

Figure 4:
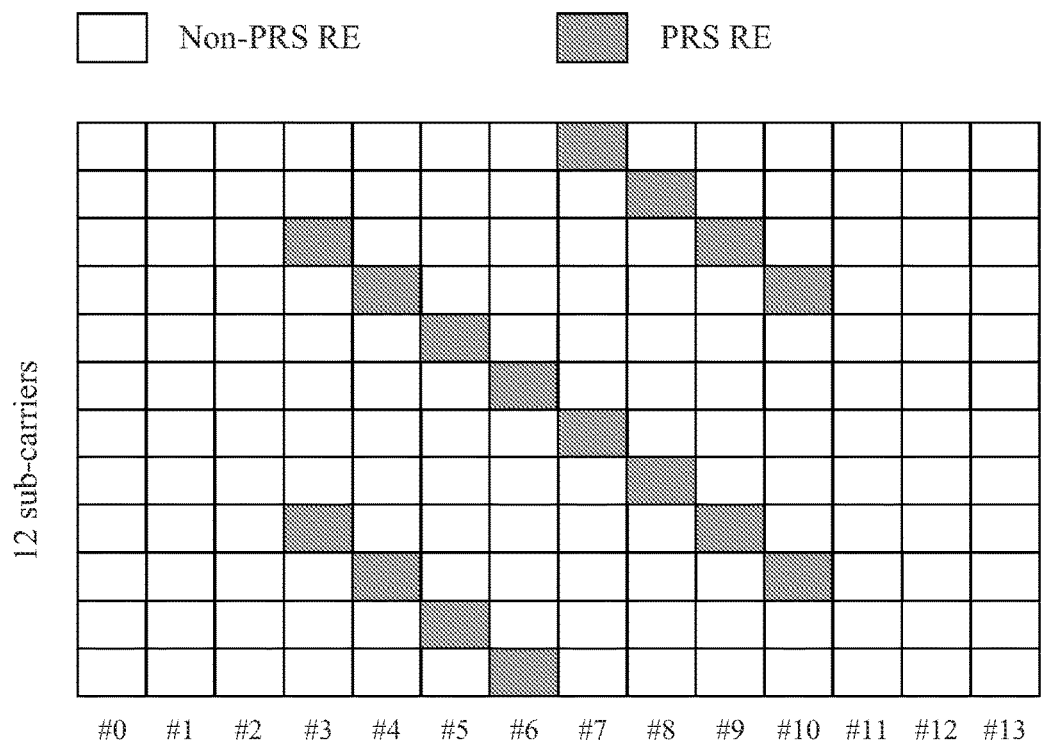
FIG. 4 illustrates an exemplary mapping of basic PRS resource configurations.

Then, the base station can further determine which symbols are used according to a greatest common slot format. Because the control regions of control signaling and other reference signals in one PRB are flexible and their configurations may be variable, the slot format may be changed over time. However, there may be some common characters in these slot formats. For example, generally the first three symbols (e.g. symbols #0, #1, #2 in FIG. 4) may be used to configure CORESET for control signaling transmission. The last a few symbols may be configured for uplink transmission for fast ACK/NACK feedback. The base station can hence avoid configuring PRS on these "busy" symbols (the probability of which to be occupied by other signals in various slot formats is high), but on some "stable" symbols (the probability of which to be occupied by other signals in various slot formats is low) as shown in FIG. 4.

The extended PRS resource configuration is an extension of basic PRS resource configuration. In comparison with the basic PRS resource configuration, it further comprises additional resource elements to provide additional symbols for PRS transmission. The base station can determine the extended PRS resource configuration according to many features, e.g. including:

The interference situation. If the interference level is low, the PRS could be allocated on additional resources (which are not coordinated among neighbor cells), as additional PRSs with low interference can bring some combining gain.

Short-term slot format and frame structure. If there is no uplink part in subsequent slots, the base station could allocate PRSs on additional symbols at the end of a slot.

Downlink and/or uplink traffic situation. If downlink and/or uplink traffics in buffers are relative low, the base station does not need to configure too many resources for control information. That means the base station could allocate more resource for PRS transmission.

Requirement of positioning accuracy. If very high positioning accuracy is required, the base station could allocate more PRS resource to burst detection performance.

Figure 5:
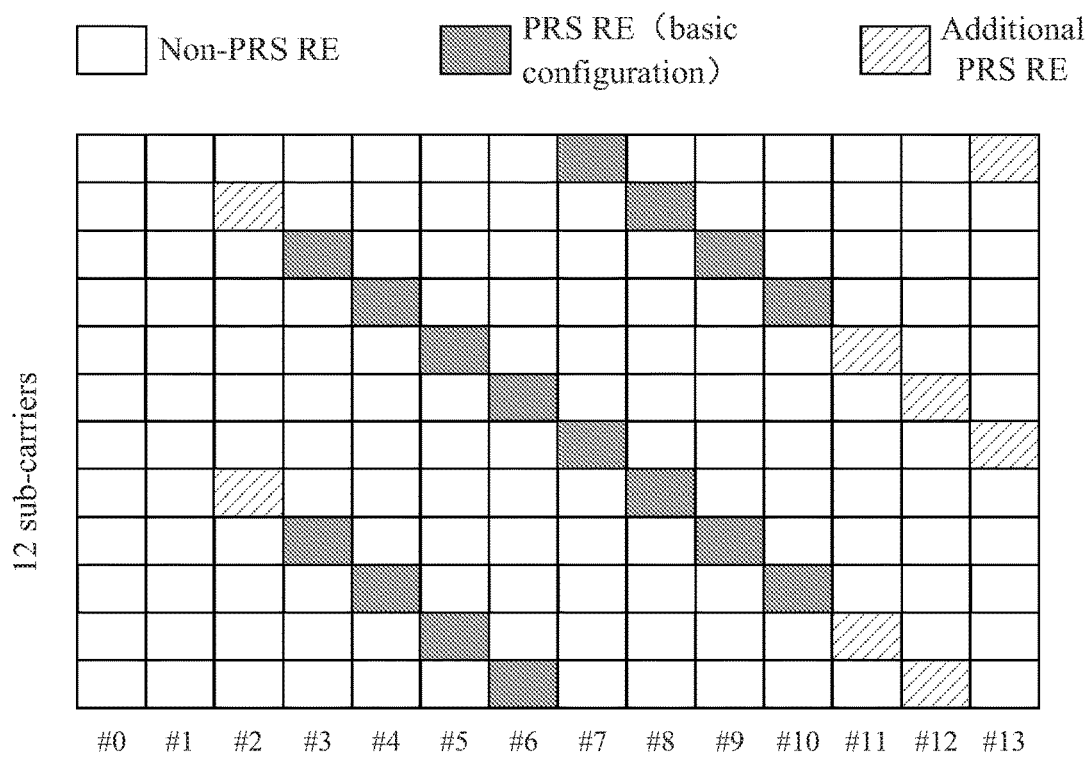
FIG. 5 illustrates an exemplary mapping of extended PRS resource configurations.

For example, if the control overhead and interference level are low, the base station could configure some extended PRS REs (resources) by extending the basic PRS resource configuration with additional symbols for PRS, as shown in FIG. 5. In some scenarios, the base station can extend the basic PRS resource configuration on-demand. For example, a set of extended PRS resource configuration can be determined to provide an on-demand high accurate positioning.

The basic and extended PRS resource configurations can indicated to UEs in any suitable way to facilitate PRS transmission to the UEs according to the at least one of the basic PRS resource configuration and the extended PRS resource configuration. FIG. 6 illustrates a flowchart 600 of a PRS transmission procedure according to an embodiment of the disclosure. After the set of basic PRS resource configuration is determined and configured, for example at the point of "action A" shown in FIG. 6, the base station 610 can indicate the set of basic PRS resource configuration to a location server 620. For example, the base station 610 can transmit an indication of the set of basic PRS resource configuration to the location server 620 via LPPa (LTE Positioning Protocol A) protocol, as shown at 601.

Then, the location server 620 can indicate the set of basic PRS resource configuration to UEs. For example, as shown at 602, the location server 620 can transmit an indication the set of basic PRS resource configuration to UE1 630 and UE2 640. UE1 can be a user equipment in a serving cell of the base station 610, while UE2 can be a user equipment which is not in a serving cell of the base station 610. In an embodiment, these UEs are triggered to report location measurement. For example, the indication can be carried in a message for triggering UE1 and UE2 to report location measurement. This can be done by LPP (LTE Positioning Protocol) protocol. In another example, the indication can be carried in a message in response to a request from UE1 and UE2.

After the set of extended PRS resource configuration is determined and configured, for example at the point of "action B" shown in FIG. 6, the base station 610 can indicate the set of extended PRS resource configuration to its own serving UEs. As shown at 604, the base station 610 can transmit an indication of the set of extended PRS resource configuration to UE1 630, for example via Physical layer signaling or RRC signaling. With regard to the form of the indication of the set of extended PRS resource configuration, the base station 610 can indicate the full information of the extended PRS resource configuration, i.e. the actual configuration. For example, for the exemplary extended PRS resource configuration of FIG. 5, the mapping of all resource elements for all PRS symbols can be indicated. Alternatively, the base station can only indicate information on difference between the set of extended PRS resource configuration and the set of basic PRS resource configuration. Also take the exemplary extended PRS resource configuration of FIG. 5 for example, the mapping of only the additional PRS resource elements in comparison with the set of basic PRS resource configuration can be indicated.

Then, the base station 610 can configure positioning reference signals according to the set of basic PRS resource configuration and/or the set of extended PRS resource configuration as shown at the point of "action C", and transmit the positioning reference signals to the UEs (including UE1 and UE2) as shown at 605. Correspondingly, the UEs can receive positioning reference signals from the base station 610 according to the set of basic PRS resource configuration or the set of extended PRS resource configuration. By virtue of the received positioning reference signals, the UEs can perform TOA estimation.

In an example, the base station 610 can transmit the positioning reference signals to the UEs according to the set of extended PRS resource configuration. As shown at 606a, the UE1 can perform serving cell TOA estimation according to the extended PRS resource configurations. As shown at 606b, the UE2 can perform non-serving cell TOA estimation based on the set of basic PRS resource configuration received from the location server 620.

In another example, the base station 610 can transmit the positioning reference signals to the UEs according to the set of basic PRS resource configuration. Then, both UE1 and UE2 can perform TOA estimation based on the set of basic PRS resource configuration received from the location server 620.

FIG. 7 illustrates another exemplary flowchart 700 of a PRS transmission procedure. In this example, the base station 710 configures and indicates both a set of basic PRS resource configuration and a set of extended PRS resource configuration to a location server 720. The indication of the set of basic PRS resource configuration can be transmitted together with or separate from the indication of the set of extended PRS resource configuration. For example, as shown at 701, the base station 710 transmits an indication of the set of basic PRS resource configuration to the location server 720, and then the location server 720 can convey the indication of the set of basic PRS resource configuration to UE1 and UE2 as shown at 702 and 703. At 704, the base station 710 transmits an indication of the set of extended PRS resource configuration to the location server 720, and then the location server 720 can convey the indication of the set of extended PRS resource configuration to UE1 and UE2 as shown at 705 and 706.

In another embodiment, the indication of the set of basic PRS resource configuration can be transmitted to the location server 720 together with the indication of the set of extended PRS resource configuration. Then, the location server 720 can convey these sets of PRS resource configurations to UEs who have localization service or requirement.

In another embodiment, the base station 720 can indicate the extended PRS resource set to other base stations (not shown) via X2 interface. Then, the other base stations may convey the set of extended PRS resource configuration to its serving user equipment, such as UE2 740.

A UE can perform serving cell TOA estimation according to the set of extended PRS resource configuration. For example, when the base station 710 configures and transmits PRS signals according to the set of extended PRS resource configuration, the UE1 730 in a serving cell supported by the base station 710 can perform location measurement according to the set of extended PRS resource configuration, as shown at 708*a*. Meanwhile, the UE2 740 which is not in a serving cell supported by the base station 710 can also perform location measurement according to the set of extended PRS resource configuration.

Although there is only one node (e.g. base station 610) generating and transmitting the PRS signals in FIGS. 6 and 7, it should be appreciated that there are generally multiple nodes transmitting PRS signals. Accordingly, the UEs may perform TOA estimation based on PRS signals from multiple nodes.

The location server may be a functionality entity for providing a positioning service. For example, the location server can resident in an E-SMLC (Enhanced Serving Mobile Location Centre) entity of a LTE system. In another example, the location server 620 can be implemented as a software application in a cloud.

Figure 8:
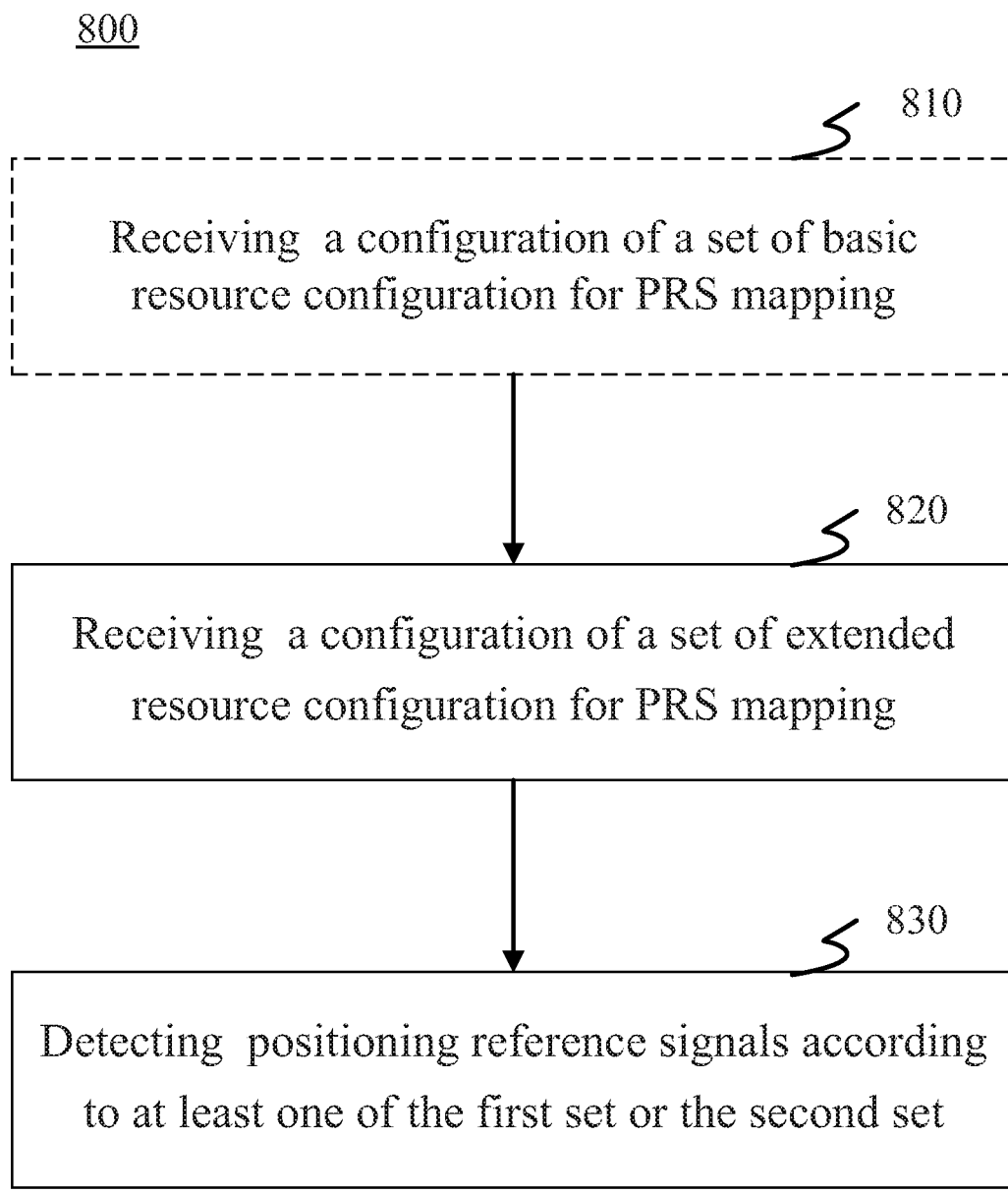
FIG. 8 illustrates a flowchart of a PRS transmission procedure according to at least part of embodiments of the disclosure.

Reference is now made to FIG. 8, which illustrates a flowchart of a method for PRS transmission procedure according to some embodiments of the disclosure. The method 800 can be performed at a UE, such as UE 630, 640, 730, 740 as shown in FIGS. 6 and 7. As shown at block 810, the method 800 comprises receiving a configuration of a set of basic PRS resource configuration. In an example, this configuration can be received from a location server with an indication. From this indication, the UE can be informed of the basic PRS resource configuration, and accordingly know how PRS symbols are mapped to basic PRS resource elements (e.g. in one PRB).

At block 820, the method 800 comprises receiving a configuration of a set of extended PRS resource configuration. In an example, this configuration can be received from a serving base station of the UE as shown in FIG. 6. In another example, this configuration can be received from a location server as shown in FIG. 7. From this indication, the UE can be informed of the set of extended PRS resource configuration.

As shown at block 830, the method 800 comprises detecting the positioning reference signals from the base station, according to at least one of the set of basic PRS resource configuration and the set of extended PRS resource configuration.

In some embodiments, the base station can indicate the presence of the extended PRS resource elements in a basic PRS resource element. For example, the base station can transmit a specific sequence in the basic PRS resource element, to indicate the presence of the extended PRS resource configuration. In addition, the specific sequence can further be used to indicate locations of the additional resource elements relative to the basic PRS resource elements.

Correspondingly, UEs can be informed of the presence of the extended PRS resource configuration and derive the extended PRS resource elements by using the basic PRS resource element. For example, the UEs can receive an indication of a set of basic PRS resource configuration at first, and detect PRS symbols in basic PRS resource elements configured according to the set of basic PRS resource configuration. From these basic PRS resource elements, the UEs may further detect an indication (e.g. a special sequence) of the presence of the extended PRS resource configuration. Furthermore, the UEs may derive the extended PRS resource configuration from some information in the basic PRS resource elements. Then, the UEs can detect PRS symbols according to the derived extended PRS resource configuration.

A UE can perform serving cell TOA (Time of Arrival) estimation according to the extended PRS resource configuration.

There are multiple potential ways for a UE to perform non-serving cell TOA estimation. In an embodiment, a UE can perform non-serving cell TOA estimation according to the basic PRS resource configuration. In another embodiment, the UE can perform non-serving cell TOA estimation according to the extended PRS resource configuration, if it receives the extended PRS resource configuration from a location server.

In yet another embodiment, the UE could perform serving cell TOA estimation or non-serving cell TOA estimation according to the extended PRS resource configuration, if it detects the presence of PRS transmission on resources in extended PRS resource configuration. The base station can indicate the presence of extended PRS resource in basic PRS resource elements, e.g., by transmitting a specific sequence in the basic PRS resource elements.

In this disclosure, a joint ("basic+extended") configuration is proposed to support more flexible PRS resource allocation at least for serving cell UEs and minimize the impact to non-serving TOA estimation. The set of basic PRS resource configuration can be relatively-static, whereas the extended PRS resource configuration is relatively-dynamic. It means that the extended PRS resource configuration can be adjusted dynamically. There may be one or more sets of extended PRS resource configuration. These extended PRS configurations provide a flexibility to a base station, through enabling the base station to control the positioning accuracy and the impact on normal traffic performance by adjusting the number of resources configured to PRS. Whereas, the basic PRS resource configuration can provide a guaranteed positioning accuracy to at least non-serving cell UEs. Further, it also avoids large information exchange overhead to transfer more dynamic extended resource configuration among base stations, the location server and UEs.

The other advantage of embodiments in this disclosure is providing a higher reliable node (serving cell) for OTDOA positioning algorithms. In a multi-node (for example four-node) localization scenario, a high accurate TOA value can improve the whole location accuracy by ruling out some error points due to detection error or promoting the weight of high accurate point in positioning algorithms. Embodiments in this disclosure can provide an on-demand high accurate positioning reference point.

Figure 9:
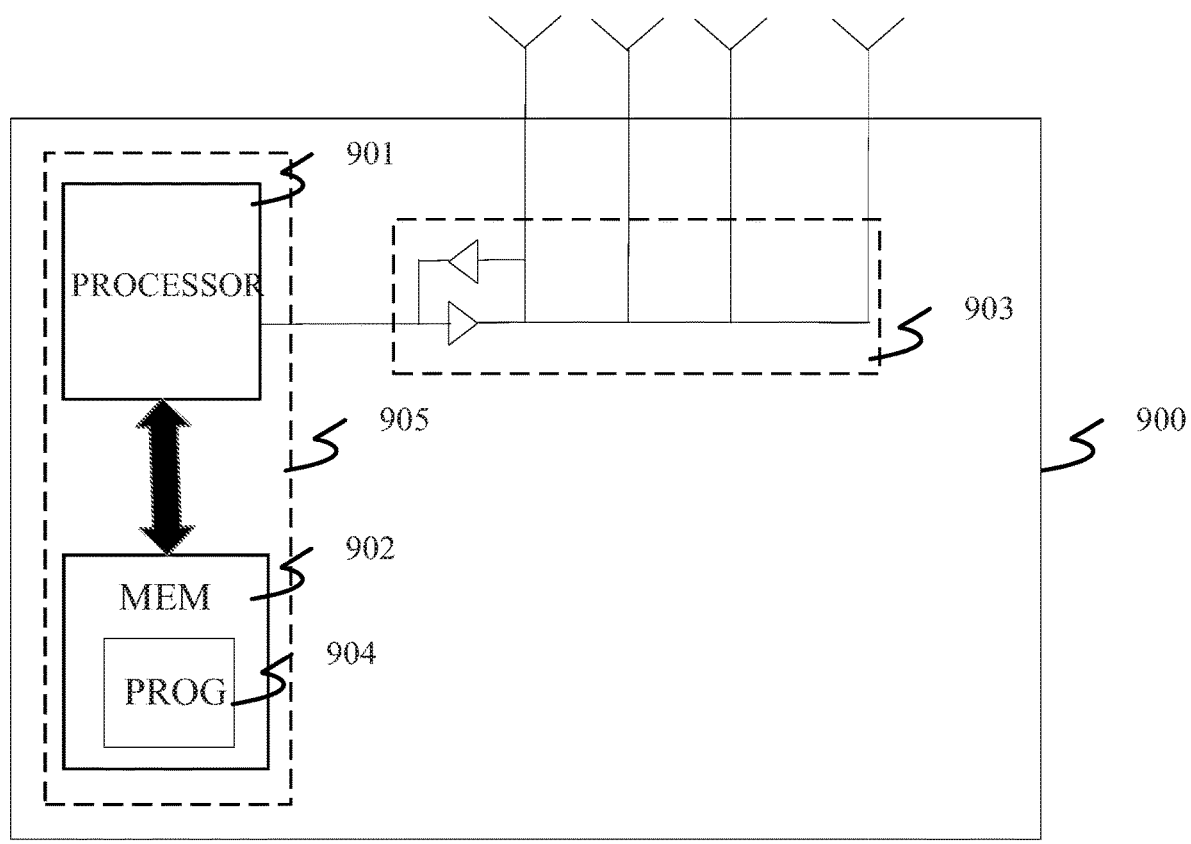
FIG. 9 is a block diagram illustrating an apparatus according to an embodiment of the disclosure.

Reference is now made to FIG. 9, which illustrates a simplified block diagram of an apparatus 900 according to some embodiments of the present disclosure. The apparatus may be embodied in/as a base station, which can communicate with UEs and a location server. For example, the base station may be a base station 610, 710 as shown in FIGS. 6 and 7. The apparatus 900 is operable to carry out the exemplary method 200 as described with reference to FIG. 2, and possibly any other processes or methods.

In another embodiment, the apparatus 900 may be embodied in/as another entity at a user side, such as a UE, which can be communicatively connected to the base station. The apparatus 900 is operable to carry out the exemplary method 800 as described with reference to FIG. 8, and possibly any other processes or methods.

It is also to be understood that any one of the methods 200 and 800 are not necessarily carried out completely by the apparatus 900. Some steps of the methods 200 and 800 may be performed by one or more other entities.

The apparatus 900 may comprise at least one processor 900, such as a data processor (DP) and at least one memory (MEM) 902 coupled to the processor 901. The apparatus 900 may further comprise a transmitter TX and receiver RX 903 coupled to the processor 901. The MEM 902 stores a program (PROG) 904. The PROG 904 may include instructions that, when executed on the associated processor 901, enable the apparatus 900 to operate in accordance with the embodiments of the present disclosure, for example to perform the method 200 or 800. A combination of the at least one processor 901 and the at least one MEM 902 may form processing means 905 adapted to implement various embodiments of the present disclosure.

Various embodiments of the present disclosure may be implemented by computer program executable by the processor 901, software, firmware, hardware or in a combination thereof. The processors 901 may be of any type suitable to the local technical environment, and may include one or more of general purpose computers, special purpose computers, microprocessors, digital signal processors DSPs and processors based on multicore processor architecture, as non-limiting examples. The MEMs 902 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The transmitter TX and receiver RX 903 can have antennas that utilize various transmission diversity schemes for supporting PRS transmission.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method comprising, receiving, at a user equipment, a first configuration of a first set of resources for positioning reference signal mapping to resource elements; receiving, at the user equipment, a second configuration of a second set of resources, wherein the second set of resources are a scalable extension of the first set of resources for positioning reference signal mapping to additional resource elements; and detecting, at the user equipment, positioning reference signals according to at least one of the first configuration of the first set of resources or the second configuration of the second set of resources; and measuring, at the user equipment, positioning accuracy using the first configuration of the first set of resources, and second configuration of the second set of resources; and providing a reliable cell for observed time difference of arrival (OTDOA) positioning algorithms, by performing both serving cell time of arrival (TOA) estimation and non-serving cell TOA estimation using the second set of resources.

2. The method according to claim 1, wherein the at least one of the first configuration of the first set of resources or the second configuration of the second set of resources are received from a location server or a base station.

3. The method according to claim 1, further comprises receiving an indication of a presence of the second set of resources, wherein receiving the indication comprises detecting the presence of the second set of resources from predefined positioning reference signals in at least one of the resource elements according to the first configuration of the first set of resources, and wherein the predefined positioning reference signals are received via a New Radio system.

4. An apparatus, comprising: at least a processor; and a memory, communicatively associated with the processor with computer coded instructions stored therein, said instructions when executed by the processor cause the apparatus to: determine a first configuration of a first set of resources for positioning reference signal mapping to resource elements; determine a second configuration of a second set of resources, wherein the second set of resources are a scalable extension of the first set of resources for positioning reference signal mapping to additional resource elements; and transmit at least one of the first configuration of the first set of resources and the second configuration of the second set of resources, to configure positioning reference signal transmission according to at least one of the first configuration of the first set of resources or the second configuration of the second set of resources.

5. The apparatus according to claim 4, wherein the first configuration of the first set of resources is determined based on at least one of a basic requirement of positioning accuracy and a greatest common slot format among various slot formats of transmission resources.

6. The apparatus according to claim 4, wherein when executed by the processor, the computer coded instructions further cause the apparatus to: derive a configuration of a full-set of resources that comprises available resource elements for positioning reference signal mapping based on a common rule, wherein at least one of the first configuration of the first set of resources or the second configuration of the second set of resources is determined from the configuration of the full-set of resources.

7. The apparatus according to claim 4, wherein the second configuration of the second set of resources is determined according to at least one of the following factors, a common rule for positioning reference signal mapping; an interference situation; a short-term slot format and frame structure; a traffic situation in downlink or uplink; or additional requirement of positioning accuracy.

8. The apparatus according to claim 4, wherein when executed by the processor, the computer coded instructions further cause the apparatus to transmit at least one of the first configuration of the first set of resources or the second configuration of the second set of resources by transmitting a second configuration of the second set of resources from a base station to one or more user equipment, wherein the one or more user equipment is being served by the base station.

9. The apparatus according to claim 4, wherein when executed by the processor, the computer coded instructions further cause the apparatus to transmit at least one of the first configuration of the first set of resources or the second configuration of the second set of resources by transmitting a second configuration of the second set of resources to a location server or another base station, so as to convey the second configuration of the second set of resources to at least one user equipment.

10. The apparatus according to claim 4, wherein when executed by the processor, the computer coded instructions further cause the apparatus to transmit positioning reference signals according to one of the first configuration of the first set of resources or the second configuration of the second set of resources.

11. The apparatus according to claim 10, wherein when executed by the processor, the computer coded instructions further cause the apparatus to transmit the positioning reference signals according to one of the first configuration of the first set of resources or the second configuration of the second set of resources in response to a request from a location server or based on a determination of a base station.

12. The apparatus according to claim 10, wherein when executed by the processor, the computer coded instructions further cause the apparatus to transmit positioning reference signals according to the second configuration of the second set of resources by transmitting an indication of a presence of the second set of resources.

13. The apparatus according to claim 12, wherein transmitting an indication of a presence of the second set of resource configuration comprises transmitting predefined positioning reference signals in at least one of the resource elements according to the first configuration of the first set of resources.

14. An apparatus, comprising: at least a processor, and a memory, communicatively associated with the processor with computer coded instructions stored therein, said instructions when executed by the processor cause the apparatus to: receive a first configuration of a first set of resources for positioning reference signal mapping with resource elements; receive a second configuration of a second set of resources, wherein the second set of resources are a scalable extension of the first set of resources for positioning reference signal mapping with additional resource elements; and detect positioning reference signals according to at least one of the first configuration of the first set of resources or the second configuration of the second set of resources; and measure, at a user equipment, positioning accuracy using the first configuration of the first set of resources, and second configuration of the second set of resources; and provide a reliable cell for observed time difference of arrival (OTDOA) positioning algorithms, by performing both serving cell time of arrival (TOA) estimation and non-serving cell TOA estimation using the second set of resources.

15. The apparatus according to claim 14, wherein when executed by the processor, the computer coded instructions further cause the apparatus to detect an indication of a presence of the second set of resources.

16. The apparatus according to claim 15, wherein when executed by the processor, the computer coded instructions further cause the apparatus to detect an indication of the presence of the second set of resources by detecting the presence of the second set of resources from predefined positioning reference signals in at least one of the resource elements according to the first configuration of the first set of resources.

17. The apparatus according to claim 14, wherein the second configuration of the second set of resources is received from a location server or a base station which is serving the user equipment.

18. The apparatus according to claim 14, wherein the positioning reference signals are received via a New Radio system.

* * * * *